United States Patent [19]

Hench et al.

[11] Patent Number: 4,849,378
[45] Date of Patent: Jul. 18, 1989

[54] ULTRAPOROUS GEL MONOLITHS HAVING PREDETERMINED PORE SIZES AND THEIR PRODUCTION

[75] Inventors: Larry L. Hench; Gerard F. Orcel, both of Gainesville, Fla.

[73] Assignee: University of Florida, Gainesville, Fla.

[21] Appl. No.: 704,968

[22] Filed: Feb. 25, 1985

[51] Int. Cl.⁴ .................... B01J 13/00; C01B 33/158; C03C 3/04

[52] U.S. Cl. .................................. 501/12; 252/315.6; 252/315.7; 264/42; 423/338; 502/233; 502/405

[58] Field of Search .......................... 252/315.6, 315.7; 264/42; 423/338; 501/12; 502/233, 405

[56] References Cited

U.S. PATENT DOCUMENTS

| | | | |
|---|---|---|---|
| 2,276,314 | 3/1942 | Kirk | 252/313.2 X |
| 3,801,705 | 4/1974 | Krekeler et al. | 423/338 |
| 3,847,583 | 11/1974 | Dislich et al. | 501/12 X |
| 4,323,381 | 4/1982 | Matsuyama et al. | 501/12 X |
| 4,389,385 | 6/1983 | Ramsay | 252/315.01 X |
| 4,432,956 | 2/1984 | Zarzycki et al. | 501/12 X |

*Primary Examiner*—Richard D. Lovering
*Attorney, Agent, or Firm*—Finnegan, Henderson, Farabow, Garrett & Dunner

[57] ABSTRACT

A method of fabricating an ultraporous $SiO_2$ containing gel monoliths having a predetermined mean pore size with narrow distribution of the size of the pores around the mean. A $SiO_2$ containing sol is prepared while simultaneously controlling and preselecting the temperature, time and nature of aging solution, and drying the resultant gel to obtain an ultraporous $SiO_2$ containing monolith having a predetermined mean pore size from about 10 Å to about 400 Å with narrow distribution of the size of pores around the mean and the resultant article.

8 Claims, 2 Drawing Sheets

ULTRAPOROUS GEL MONOLITHS HAVING PREDETERMINED PORE SIZES AND THEIR PRODUCTION

This invention was made with Government support under F49620-83-C-0072 awarded by the Air Force. The Government has certain rights in this invention.

BACKGROUND OF THE INVENTION

1. Field of Invention

The present invention relates to a novel method for fabricating ultraporous gel monoliths having predetermined mean pore sizes with very narrow distributions of the size of the pores around the means, and to novel ultraporous gel monoliths having predetermined mean pore sizes with very narrow distributions of the size of pores around the mean.

2. Description of the Prior Art

Materials with pore distributions are known in the art and include: (1). chemically etched alkali borosilicate glass (Corning Thirsty Glass) which is made by melting and casting a phase separable glass and then chemically leaching the soluble akali borate phase, leaving a porous boro silica glass matrix. However, it is not possible to produce a narrow range of ultrapore distributions by this method and the glass matrix has residual sodium and boron impurities.; (2). use of high energy particle bombardment of polymers and subsequent chemical etching of the damage tracks to produce mesoporosity, such as, in the filters produced by Millipore Corp. The size of the porosity, and pore size distribution, is limited by this damage track etching method and the matrix material is restricted to polymers.

In contrast to the above state of the art methods of producing controlled pore distributions, the present invention makes it possible to produce controlled pore distributions much smaller in scale and narrower in size range of the pores in an extraordinarily chemically and thermally resistant material such as high purity silica ($SiO_2$) and also in $SiO_2$-$Li_2O$-$Al_2O_3$-$TiO_2$ (Slat) gel compositions which have very low thermal expansion coefficients.

SUMMARY OF THE INVENTION

The foregoing objects and advantages of the present invention are accomplished by controlling the ultraporosity of gels by varying the temperature, duration and other conditions of aging. By controlling the aging process, mean pore sizes can be varied from 12 Å to 175 Å radius or greater with very narrow distributions of the size of the pores around the mean.

The uses for the ultraporous gels made according to the present invention include: chemical and biological filter membranes; substrates for catalysts; chemically specific adsorbants; carriers of enzymes, antibodies, antigens; substrates for chemical and biological diagnostic molecules; substrates for specific cellular attachments; chemical and biological sensors; substrates for biochip computer molecules; and structures for impregnation with non-linear optic materials, semiconductors, conductors, superconductors; and low elastic modulus structures for impregnation with high elastic modulii reinforcing agents such as SiC from polysilas precursors, or $Si_3N_4$ by chemical vapor deposition.

DETAILED DESCRIPTION OF PREFERRED EMBODIMENTS

Figure 1:
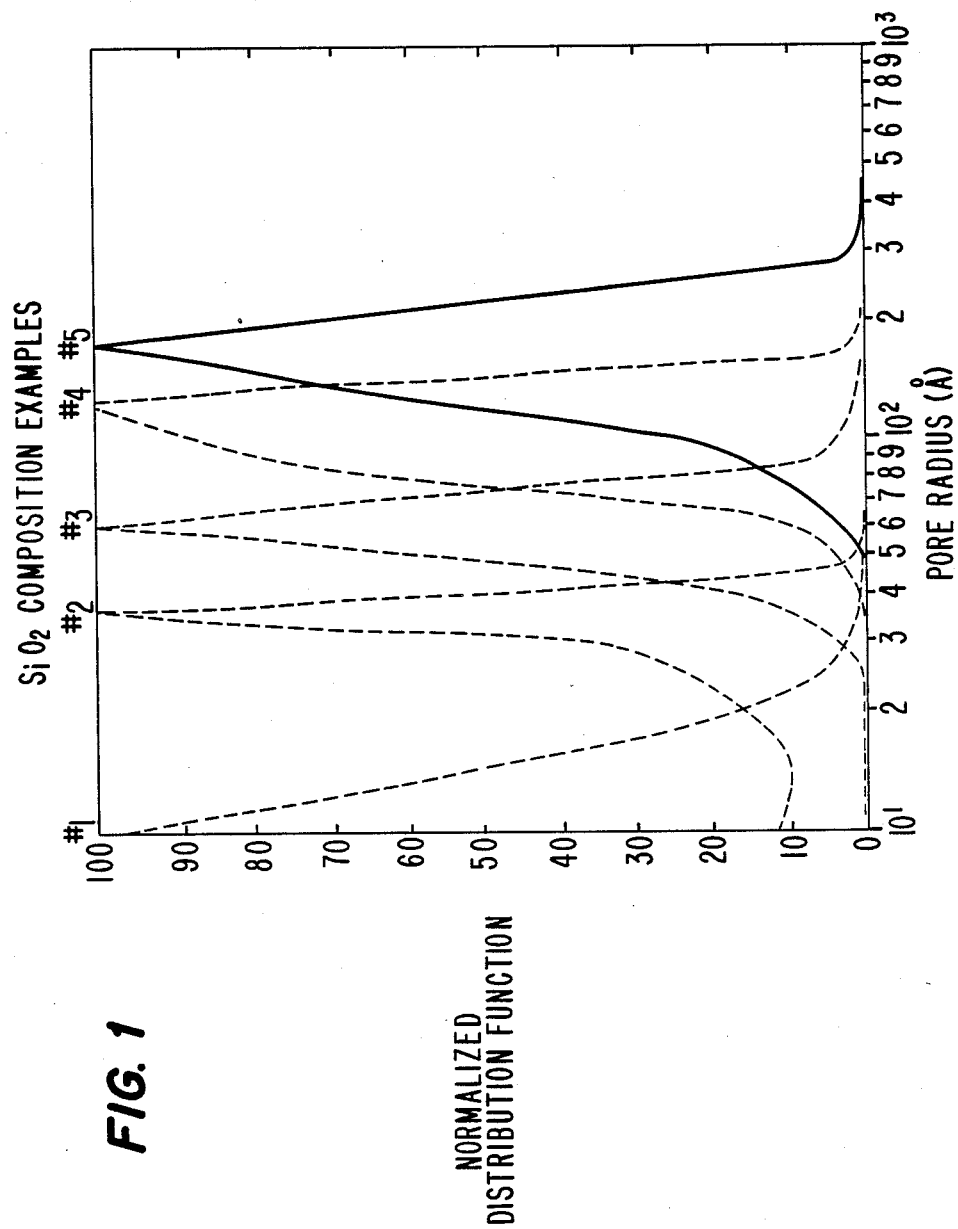
FIG. 1 is a graph showing the range of pore size distributions for Examples 1-5.
Figure 2:
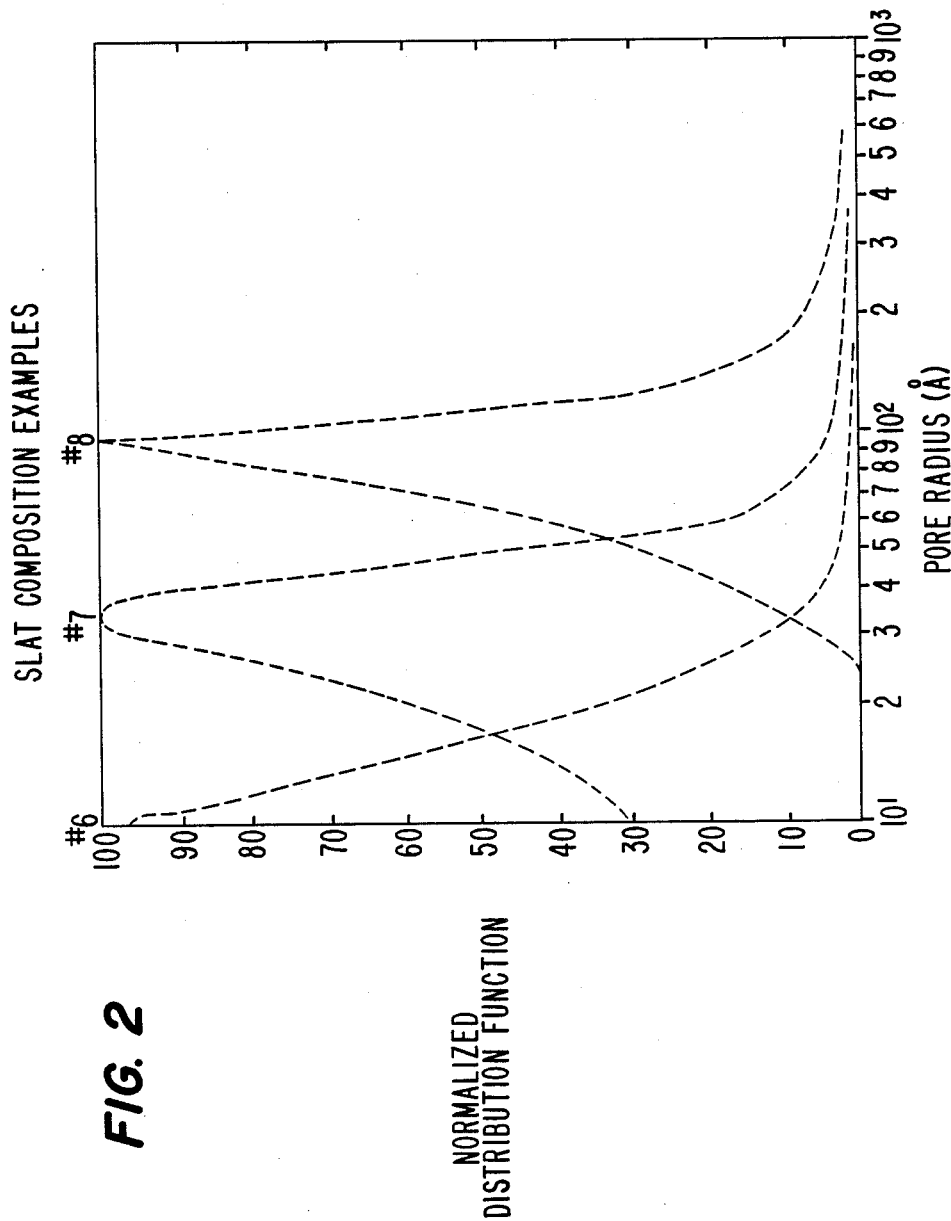
FIG. 2 is a graph showing the range of pore size distributions for Examples 6-8.

The present invention uses the prior developed method for making silica containing gels described in copending applications Ser. Nos. 583,741; 924,178 (now abandoned); and 924,179 (now abandoned) filed Oct. 27, 1986 here, incorporated by reference, or any other known method. The gel may be pure silica or may contain one or more of other oxides such as $Al_2O_3$, $Li_2O$, $Na_2O$, $TiO_2$ and $B_2O_3$.

In order to control ultrapore distribution in $SiO_2$-containing gels, the following process parameters must be controlled simultaneously. In the sol preparation, the nature and concentration of solvent must be controlled. The solvents that can be used include methyl alcohol (preferably), ethyl alcohol, dioxane, $CH_3$—CN (methyl cyanate) and dimethyl formamide. The concentration of solvent may vary from about 50% to about 80% by volume (60% is preferred) based on the oxide precursors, water for hydrolysis and solvent. the quantity of water for hydrolysis should be controlled to that needed for the hydrolysis of the oxide precursors. The catalysts and electrolytes for hydrolysis should be carefully restricted. Use of a drying control chemical additive is important and formamide is the additive of choice since it controls hydrolysis. The temperature used during synthesis was controlled to be room temperature.

Similarly, the aging conditions, time, temperature and nature of aging solution, must be simultaneously controlled. The temperature may be held at from about 0° C. to about 200° C. Generally, the higher the temperature, the larger the mean pore size. The time may take from 1 minute to 1 month and generally, the longer the time, the larger the mean pore size. The nature of the aging solution may vary from only solvent to solvent followed by an electrolyte such as $NH_4OH$ (preferably), NaOH, KOH, HCl, $H_2SO_4$ and $HNO_3$.

The following series of specific examples show how variations in the aging conditions can be used to vary the mean pore radii of pure silica gels from 12 Å to 172 Å. Additional specific examples follow which show how similar variations in aging conditions can shift the pore distributions of gels made of 70 mole % $SiO_2$ - 29 mole % $Al_2O_3$ - 6 mole %$TiO_2$ - 5 mole % $Li_2O$.

All the silica gels were prepared in the following way, unless otherwise indicated: Methanol solvent was mixed with formamide at room temperature while stirring. 2.9 cc of tetrameth oxysiliane were added by pouring or dropwise to the methanol-formamide solution. Added dropwise to the above room temperature solution, at about 5 drops/sec, was 6.6 cc of the following mixture: 3 cc methanol and 3.6 cc of deionized water. Stirring was continued during and following the addition for several minutes. Next, the mixed solution was cast into Teflon vials and sealed with caps. The closed containers were transferred to an aging chamber at a specific temperature for the desired aging treatment. Aging was carried out for the temperature-time-atmosphere conditions indicated in the specific examples. Thereafter, the samples were dried in an open air furnace at 230° C. for 24 hours. Finally, the samples were outgassed by heating at 300° C. under vacuum for 5 hours. The specific surface area (SA) in m$^2$/g, the pore volume (PV) cc/g, and the average pore radius $\rho$ in Å using an Autosorb 6 automated pore distribution analyzer were measured for each sample.

The range of pore size distributions is shown in FIG. 1 for examples 1–5.

SPECIFIC EXAMPLE #1 - SILICA (12 Å Ultrapores)

Only methanol solvent was used in the foregoing general procedure set forth above for sol preparation and no foramide was used. The aging condition was 15° C. in the methanol solution for 24 hours. The resulting characteristics were:

SA = 607 m$^2$g
PV = 0.356 cc/g
$\rho$ = 12 Å

EXAMPLE #2 - SILICA (30 Å Ultrapores)

3.0 cc formamide were added with addition of the TMS in the general procedure set forth above for sol preparation. Instead of room temperature, gelation was carried out at 15° C. and aging at 15° C. in the formamide-methanol solution for 24 hours. The resulting gel characteristics were:

SA = 784 m$^2$/g
PV = 1.186 cc/g
$\rho$ = 30 Å

EXAMPLE #3 - SILICA (76 Å Ultrapores)

3.0 cc formamide were added with addition of TMS in the general procedure set forth above for sol preparation. Gelation was carried out at room temperature, and aging was effected for 24 hours at room temperature in formamide-methanol solution. Next, the aging gel was immersed in an 8 Molar solution of NH$_4$OH. The container was sealed and aging continued at 200° C. for an additional 24 hours. The resulting gel characteristics were:

SA = 393 m$^2$/g
PV = 1.487 cc/g
$\rho$ = 76 Å

EXAMPLE #4 - SILICA (119 Å Ultrapores)

Same sol preparation as Example #3 was used. Same gelation as Example #3 was used. Aging occurred in methanol-formamide solution for 24 hours at room temperature. Next, the partially aged gel was immersed in 8 Molar NH$_4$OH, the container closed, and aging continued at 80° C. for an additional 24 hours. The resulting gel characteristics were:

SA = 222 m$^2$/g
PV = 1.31.9 cc/g
$\rho$ = 119 Å

EXAMPLE #5 - SILICA (172 Å Ultrapores)

Same sol preparation as Example #3 was used. Gelation was carried out at 80° C. Aging was carried out at 80° C. in methanol-formamide solution for 24 hours in a sealed container. Then, the partially aged gel was immersed in 8 Molar NH$_4$OH in a closed container at 80° C. for 7 days. The resulting gel characteristics were:

SA = 158 m$^2$/g
PV = 1.365 cc/g
$\rho$ = 172 Å

For pore distributions with a large mean radius, it is necessary to use a higher molarity NH$_4$OH solution and age the gels for longer times at higher temperatures, i.e., using 10 M NH$_4$OH solution with aging at 150° C. for 30 days will produce ultrapore of about 400 Å.

Aging with or without the presence of NH$_4$OH makes it possible to obtain ultraporous silica gels with the same range of pore radii but with different numbers of pores and therefore, different ranges of SA, VA, and ultrapore volume. Thus, it is possible to tailor silica gels for a specific application as a filter or catalyst support.

The general principles to follow to increase the mean pore size without increasing the breadth of pore distribution are:

(1) Increase the formamide concentration.
(2) Age at a higher temperature, but below 160° C. to avoid decomposing formamide.
(3) Age for longer times.
(4) Increase the basicity of the aging solution.

By using sequential changes in the above four principles it is possible to tailor make a pore distribution for a specific application. Also by immersing a gel in a gradient of either NH$_4$OH or temperature it is possible to produce a controlled gradient in pore sizes across a gel or orient the pore distribution along the gradient.

Similar results were obtained for gels with the composition 70 mole % SiO$_2$ - 19 mole % Al$_2$O$_3$ - 6 mole % TiO$_2$ - 5 mole % Li$_2$O. The gels were prepared in the same way as described in copending application Ser. No. 704,918 entitled Process for Rapid Production of Large Sol-Gel Derived Aluminum Containing Monoliths filed even date herewith by the same inventors. The aging conditions were similar to those applied to the silica gels and will be described for each sample. The preparation of the gels for the analysis was to heat at 200° C. for 24 hours in an open air furnace, and then to heat at 300° C. for 22 hours under vacuum in the outgassing station of the Autosorb 6.

SPECIFIC EXAMPLE #6

The gel sample was aged at 15° C. for one day. The resulting gel characteristics were:

SA = 320
PV = 0.239
$\rho$ = 15 Å

SPECIFIC EXAMPLE #7

The gel sample was aged at room temperature for one day. It was then immersed in a 4 M NH$_4$OH solution and aged in a sealed container at room temperature for one month. The resulting gel characteristics were:

SA = 422
PV = 0.780
$\rho$ = 37 Å

SPECIFIC EXAMPLE #8

The gel sample was aged at room temperature for one day. It was then immersed in a 4 M NH$_4$OH solution and aged in a sealed container at 100° C. for one week instead of at room temperature for one month as in Example #7. The resulting gel characteristics were:

SA = 176

PV = 0.942
ρ = 107 Å

By the practice of the present invention, one is able to make a gel of a preselected mean pore size with at least 60% of the pores in the gel of a size of ±30% of the mean pore size. Also, at least 99% of the pores in the gel are within from about 0.1 to about 1 times of the mean pore size. Thus, a preselected pore size from about 10 Å to 400 Å may be obtained in a gel with narrow distribution of size around the mean, as explained.

Having now fully described the invention, it will be apparent to one of ordinary skill in the art that changes and modifications are possible that do not depart from the spirit and scope of the invention set forth herein.

What is claimed is:

1. A method of fabricating an ultraporous, $SiO_2$-containing, gel-derived monolith comprising the steps of hydrolyzing a $SiO_2$ precursor to form a sol; gelling the sol; aging the gelled sol; and drying the aged gelled sol; wherein the temperature of, the duration of, the solvent concentration used in and the additives used in the hydrolyzing, gelling, aging and drying steps are controlled and preselected to obtain an ultraporous, $SiO_2$-containing monolith, having a pore volume of between about 0.2 and about 1.5 $cm^3/g$ and a predetermined mean pore size from about 10 Å to about 400 Å with narrow distribution of the size of pores around the mean.

2. The method of claim 1 wherein the sol also contains a constituent selected from the group consisting of $Al_2O_3$, $TiO_2$, $Li_2O$, $Na_2O$, $B_2O_3$ and mixtures thereof.

3. The method of claim 1 wherein aging occurs in a solution containing an electrolyte.

4. The method of claim 3 wherein the electrolyte is $NH_4OH$.

5. The method of claim 1 wherein the sol contains a drying control chemical additive which is formamide.

6. The method of claim 1 wherein the ultraporous gel-derived monolith is pure silica.

7. The method of claim 1 wherein the ultraporous gel-derived monolith is about 70 mole % $SiO_2$, about 29 mole % $Al_2O_3$, about 6 mole % $TiO_2$, and about 5 mole % $Li_2O$.

8. A monolith made by the process of claim 7.

* * * * *